Patented Jan. 25, 1927.

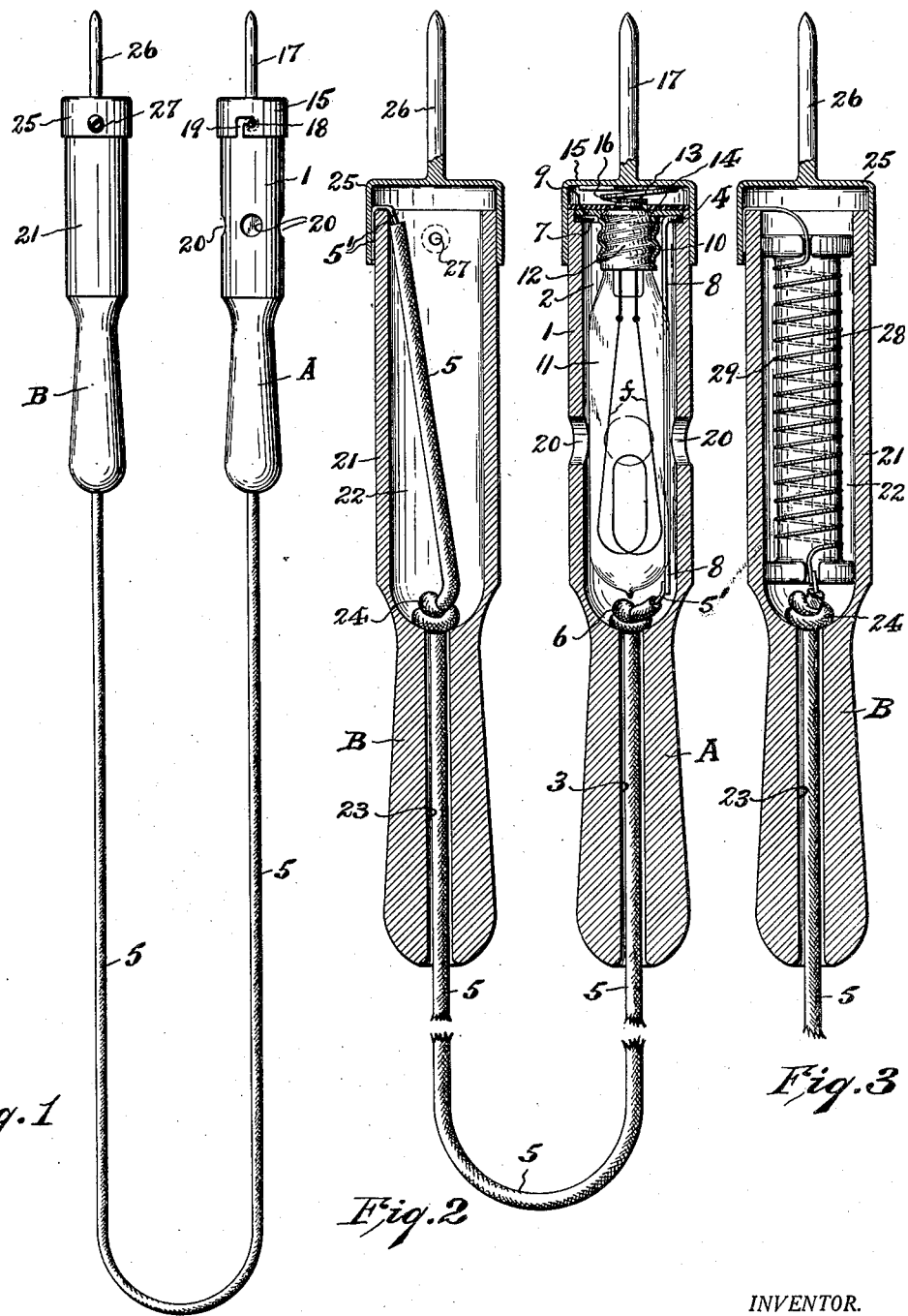

1,615,788

UNITED STATES PATENT OFFICE.

FREDERICK A. FELDKAMP, OF NEWARK, NEW JERSEY.

ELECTRIC FUSE OR CIRCUIT TESTING DEVICE.

Application filed January 6, 1922. Serial No. 527,393.

This invention relates, generally, to improvements in devices for testing electric fuses and circuits; and the invention has reference, more particularly, to a very simple, cheap and efficient electric fuse and circuit testing device, which is very easy and convenient to manipulate, and which is adapted to render a visible indication denoting a proper operative condition of the fuse or circuit tested thereby.

The invention has for its principal object to provide a novel construction of electric fuse or circuit testing device having a simple contact making means for electrically engaging the same in operative relation to the fuse or circuit to be tested; together with a novel means for supporting said contact making means, so as to afford the user adequate protection against electrical shock; and which also possesses a means in the form of a signal lamp, which becomes luminous when the device is applied to a fuse or circuit in making a test, thereby providing a visible indication that the tested fuse or circuit is in good workng order.

Another object of this invention is to provide a novel arrangement in which the contact making means, of which there are two, are electrically interconnected by a flexible connection or cable, whereby the device is readily and easily applied either to closely or comparatively widely separated points in the circuit to be tested.

Another object of this invention is to provide a means whereby the signal lamp of the device is mounted in close proximity to a contact means so that the visible signal is conveniently within the range of sight of the operator while said contact means is being applied to the fuse or circuit to be tested, thus permitting the operator to give the concentrated visual attention necessary to safely and expeditiously apply the contact making means to the required part of said fuse or circuit without danger of causing destructive short circuits or accidentally inserting the body of the operator in the circuit, and without necessity for withdrawing the gaze in order to read the signal or indication produced.

Another object of this invention is to provide insulated handles or grips for the device, which likewise serve to enclose and protect the signal lamp or lamps, and such other associated elements of the device.

Other objects of this invention, not at this time more particularly enumerated, will be clearly understood from the following detailed description of the same.

With the various objects of this invention in view, the same consists, primarily, in the novel construction of electric fuse and circuit testing device hereinafter set forth; and, the invention consists, furthermore, in the novel arrangements and combinations of the various devices and parts, as well as in the details of the construction of the same, all of which will be hereinafter more fully described, and then finally embodied in the claim appended hereto.

The invention is clearly illustrated in the accompanying drawings, in which:—

Figure 1 is a side elevation of the novel electric fuse and circuit testing device, made according to and embodying the principles of this invention.

Figure 2 is a vertical longitudinal section of the novel testing device, drawn on an enlarged scale.

Figure 3 is a detail longitudinal section of one of the handles or grips, showing the incorporation of a resistance medium or element therewith.

Similar characters of reference are employed in all of the hereinabove described views, to indicate corresponding parts.

Referring now to said drawings, the reference character A indicates one handle or grip of the novel testing device, the same being made of a suitable insulating material, such, e. g., as wood, hard rubber, fibre or the like. Said handle or grip A is provided at its upper end, and preferably forming an integral part thereof, with a hollow cylindrical member or barrel 1 providing an interior chamber or compartment 2. Extending downwardly from the bottom of said chamber or compartment 2 through the handle or grip A is a passage or longitudinal opening 3. Said member or barrel 1 is open at its upper end, and is preferably provided at such open end with an annular seat or socket 4. Extending upwardly through said passage 3 of the handle or grip A is one end of an insulated flexible conductor or cable 5. To retain the inserted end of said conductor or cable 5 from withdrawal from operative relation to the handle or grip A, the same is drawn upwardly into the chamber or compartment 2, and a knot 6 is formed therein beyond the inner end of the passage 3, said knot 6 serving as a stop, by engaging the bottom of said chamber or compartment 2, thus securing the end of the conductor or cable in operative relation to said handle or grip. Seated upon or in the seat or socket 4 at the upper end of said chamber or compartment 2 is an annular metallic contact ring 7 with which is connected a downwardly extending tail-piece 8 adapted to extend downwardly through said chamber or compartment 2 at one side thereof. Said contact ring 7, with its tail-piece 8 provides an electrical conductor adapted to be connected electrically with said conductor or cable 5, by securing the metallic core 5' of the latter to the lower end of said tail-piece 8.

Arranged to rest upon and electrically engage said contact ring 7 is the annular flange 9 of a metallic socket piece 10. Said socket piece 10 provides a means for attaching an incandescent lamp 11 in operative relation to the testing device, said lamp having as one pole thereof an annular contact ferrule portion 12 engageable in and with said socket piece 10, while the other pole of said lamp comprises a central contact button or boss 13 in the end of the lamp butt. Extending over the upper surface of said flange 9 is a disc 14 of insulating material, the same having a central opening through which the said contact button or boss 13 projects, when the lamp is in place.

The reference character 15 indicates a metallic cap or end ferrule, which fits telescopically over and closes the open end of said member or barrel 1. Arranged within and connected with the upper wall of said cap or end ferrule 15 is a spring or yieldable contact element 16, which when said cap or end ferrule is in assembled position, operatively or electrically engages the said contact button or boss 13 of the lamp. Connected with said cap or end ferrule is an upwardly projecting contact making pin or terminal member 17. Said cap or end ferrule is detachably connected with said member or barrel 1, so that the same may be removed to permit replacement of the lamp 11, when the latter burns out or becomes from other causes inoperative. A convenient means for detachably connecting or securing said cap or end ferrule in assembled relation to the member or barrel 1, comprises one or more laterally projecting pins or studs 18 exteriorly disposed in proper location on the outer side of the member or barrel, the side walls of said cap or end ferrule having corresponding bayonet notches 19, suitably arranged to engage and cooperate with said pins or studs 18 to hold said cap or end ferrule attached to the member or barrel 1. It will be understood, however, that other mechanical means of various kinds may be employed for the purpose of securing the cap or end ferrule to said member or barrel 1, and that consequently I do not limit myself to the employment of said stud and bayonet notch arrangement above described, since such structure is but illustrative of one of the many forms of fastening means which may be employed.

As will be understood from the above description, as well as from an inspection of the accompanying drawings, the signal lamp 11 is enclosed within the barrel or member 1, and consequently is protected against accidental blows which might destroy the same, while at the same time the user is protected from flying glass, should, by any chance, the lamp break. In order, however, that the illumination of the lamp 11 shall be visible to the user of the device at proper times, the side walls of said member or barrel 1 are provided with suitably located perforations or openings 20, through which the rays of light from the lamp may be projected or rendered visible.

The reference character B indicates the opposite or second handle or grip of the novel testing device, the same being also made of a suitable insulating material, such, e. g., as wood, hard rubber, fibre or the like. Said handle or grip B is provided at its upper end, and preferably forming an integral part thereof, with a hollow cylindrical member or barrel 21 providing an interior chamber or compartment 22. Extending downwardly from the bottom of said chamber or compartment 22 through the handle or grip B is a passage or longitudinal opening 23. Said member or barrel 21 is open at its upper end. Extending upwardly through said passage or opening 23 of the handle or grip B is the opposite end of said insulated flexible conductor or cable 5. To retain the said conductor or cable 5 operatively secured to the handle or grip B, and held against accidental withdrawal therefrom, the insert end of said conductor or cable 5 is drawn upwardly into the chamber or compartment 22, and a knot 24 is formed therein beyond the inner end of the passage 23, said knot 24 serving as a stop, by engaging the bottom of said chamber or compartment 22, thus securing the cable or conductor to the handle or grip B.

The reference character 25 indicates a metallic cap or end ferrule, which fits telescopically over and closes the open end of said member or barrel 21. Connected with said cap or end ferrule is an upwardly projecting contact making pin or terminal member 26. In order to secure an electrical connection between said metallic cap or end ferrule 25 and the said opposite end of the cable or conductor 5, the metallic core 5' of the latter is freed from insulation and carried through the upper open end of the compartment or chamber 22 and then doubled back upon the exterior surface of the wall of said member or barrel 21, so that when the cap or end ferrule 25 is engaged over the open end of the member or barrel 21, its skirt will be forced into firmly secured contact with the extremity of said metallic core 5' thus arranged. The cap or end ferrule may be secured in the above described attached relation to the member or barrel 21 by screws 27, or by any other form of fastening means found convenient.

In making use of the device to test a circuit, the operator grasps the handles or grips A and B, so that they are respectively held one in each hand. The operator is thus enabled to apply the contact making pins or terminal members 17 and 26 to proper points in the circuit to be tested so that the current flowing in the circuit is shunted through the testing device. Depending upon the direction of flow of the current in circuit, and the manner in which the contact making pins or terminal members 17 and 26 are electrically engaged in the circuit, either one or the other contact making pins or terminal members becomes the positive pole of the testing device and remaining contact making pin or terminal member becomes the negative pole of the testing device. Assuming, for the purposes of illustration, that the contact pins or terminal members are so engaged in the circuit that the pin or member 17 becomes the positive pole and the pin or member 26 becomes the negative pole, then the current entering the pin or member 17 of the handle or grip A passes into the cap or end ferrule 15 and thence into the contact element 16 to the contact button or boss 13 of the lamp 11. After passing through the filament f of the lamp 11, the current enters the contact ferrule 12 of the lamp to pass thence through the metallic socket piece 10 and its flange 9 to the contact ring 7 and its tail-piece 8, whence it passes into the metallic core 5' of the conductor or cable 5. The current passes through the conductor or cable 5 to the cap or end ferrule 25 of the handle or grip B, and thence passes through the pin or member 26 back into the tested circuit. The circuit through the testing device being thus completed, the lamp 11 will be illuminated, thus giving an indication or signal that the current is properly flowing through the tested circuit. It will be obvious that the voltage capacity of the testing device must be equal to the maximum voltage which will be encountered in the circuit tested; e. g. if the device is to be used for testing only 110 volt circuits the lamp 11 may be 110 volt lamp, or if 220 volt circuits are to be tested, then the lamp 11 may be of 220 volt capacity. It will be understood, however, that, if for practical reasons, a 220 volt lamp cannot be conveniently acquired in the comparatively small size and shape employed in the testing device, the handle or grip B as well as the handle or grip A may be fitted with 110 volt lamps connected in series by the cable or conductor 5. Since, however, the signal or indication of proper current flow provided by the illumination of the lamp element of the device, is amply adequate if confined to one handle, it follows that a testing device for high voltage circuits above 110 volts may be provided by inserting in the chamber or compartment 22 of the handle or grip B a resistance element, such, e. g. as the core 28 supporting a resistance coil 29 which is electrically connected and inserted between the cap or ferrule 25 and the end of the cable 5 attached to the handle or grip B, as shown in Figure 3 of the drawings. This resistance element is thus connected in series with a 110 volt lamp 11 in the handle or grip A, and should provide resistance or voltage capacity which will with the 110 volt capacity of the lamp 11, equal the voltage of the circuit to be tested. It will be understood, that the modifications thus described are within the scope and principles of this invention as described in connection with the simplest form thereof illustrated in Figures 1 and 2 of the drawings.

The testing device thus provided is simple in construction, easily and safely manipulated, and affords an adequate means for giving a visible indication of proper current flow through an electric fuse or circuit tested thereby.

I am aware that some changes may be made in the arrangements and combinations of the various devices and parts, as well as in the details of the construction of the same, without departing from the scope of my present invention as set forth in the foregoing specification and as defined in the appended claim. Hence, I do not limit my invention to the exact arrangements and combinations of the various parts as described in said specification, nor do I confine myself to the exact details of the construction of the said parts as illustrated in the accompanying drawings.

I claim:—

In a device of the kind described, a tubular body of non-conductive material open at its upper end and having observation openings in its side walls, said body having a longitudinally aligned grip portion at its lower end provided with a longitudinal passage of reduced diameter communicating with the interior of said body, an internal annular seat at said open end of said body, a tubular conductive lamp socket having a supporting flange engaged on said seat, a perforate insulator shield above said socket, a metallic end cap having an exteriorly projecting contact member, a yieldable contact spring connected to and within said cap to cooperate with a lamp in said lamp socket, a flexible conductor entered through said grip portion passage, means to connect the inner end of said conductor with said lamp socket, means at the inner end of said conductor to prevent withdrawal thereof through said grip portion passage, and a contact making element connected with the outer end of said conductor.

In testimony that I claim the invention set forth above I have hereunto set my hand this 21st day of December, 1921.

FREDERICK A. FELDKAMP.